Nov. 14, 1961  G. A. LYON  3,008,769
WHEEL COVER
Original Filed Jan. 24, 1957

Inventor
GEORGE ALBERT LYON

United States Patent Office 3,008,769
Patented Nov. 14, 1961

3,008,769
WHEEL COVER
George Albert Lyon, 13881 W. Chicago Blvd.,
Detroit 28, Mich.
Original application Jan. 24, 1957, Ser. No. 636,158.
Divided and this application June 11, 1958, Ser. No.
741,389
7 Claims. (Cl. 301—37)

The present invention relates to automobile wheel covers, more particularly of the self-retaining type.

This application is a division of my application Serial No. 636,158, filed January 24, 1957.

An important object of the present invention is to provide for disposition at the outer side of a vehicle wheel a wheel cover construction that has a novel marginal structure and cover retaining means.

Another object of the invention is to provide a wheel cover having a novel wide sweep marginal structure for overlying a tire rim and provided with combination reinforcing, protective and pry-off facilitating underturned flange means.

A further object of the invention is to provide an improved wheel structure wherein a wheel cover is retained in press-on, pry-off relation over the outer side of a vehicle wheel including a tire rim against which an improved bottoming flange structure on the marginal portion of the cover is engageable.

Other objects, features and advantages of the present invention will be readily apparent from the following detailed description of a preferred embodiment thereof taken in conjunction with the accompanying drawings, in which.

Figure 1:
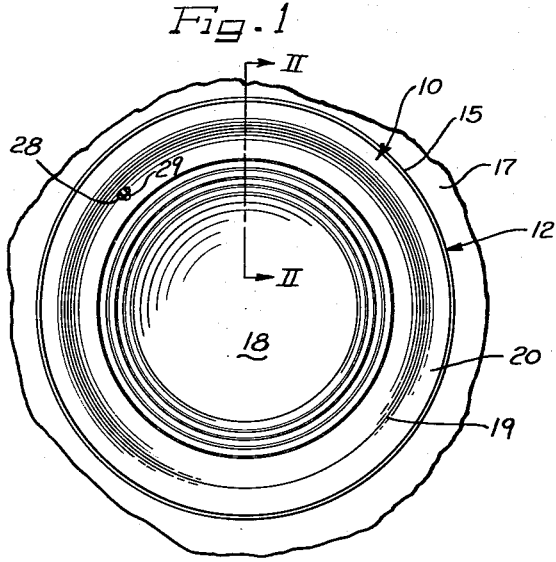
FIGURE 1 is an outer side elevational view of a wheel structure embodying features of the invention.

A wheel cover 10 is constructed and arranged to be applied to the outer side of a vehicle wheel such as an automobile wheel including a disk spider wheel body 11 carrying a multi-flange, drop center tire rim 12 including an intermediate generally axially outwardly extending and radially inwardly facing intermediate flange 13 which merges at a juncture shoulder 14 with a generally radially outwardly and then axially outwardly extending terminal flange 15. A pneumatic tire 17 is adapted to be carried by the tire rim 12.

The wheel cover 10 is shown as a full disk type of cover comprising a sheet metal cover plate of a diameter to substantially entirely cover the outer side of the wheel including the wheel body 11 and the tire rim 12, although if preferred, the cover may comprise a circular radially outer cover portion with which the instant invention is primarily concerned, and a central hub cap type of cover separable relative thereto.

Figure 2:
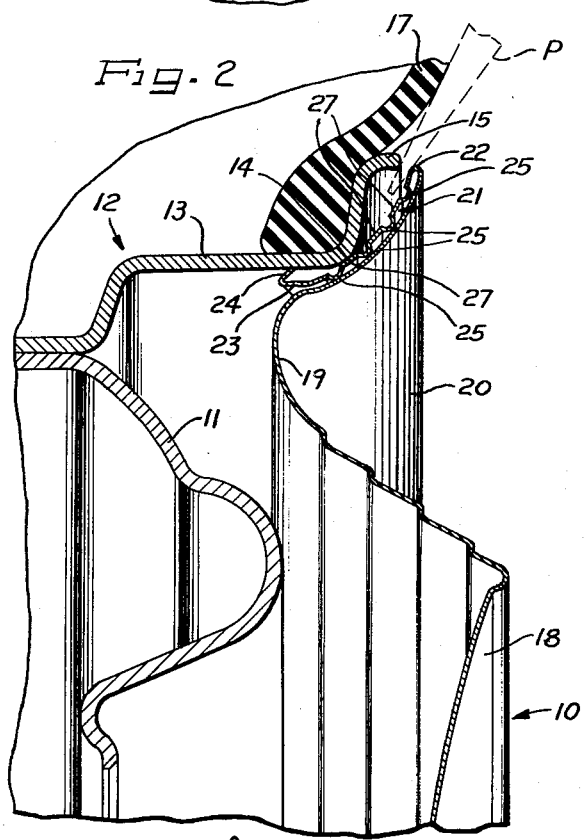
FIGURE 2 is a fragmentary enlarged radial sectional detail view taken substantially on the line II—II of FIGURE 1.

In the present instance, the cover 10 includes a central crown portion 18 for overlying the wheel body and connected by an intermediate annular dished portion 19 with a radially outer circular marginal portion 20 which slopes generally radially and axially outwardly and is of an overall diameter to overlie the terminal flange 15. In the present instance the outer marginal cover portion 20 is of convex outer side cross-sectional contour with a corresponding inner side concave contour. It will be observed from FIGURE 2 that the outer marginal cover portion 20 is dimensioned to extend with its radially outer extremity adjacent to the tip of the terminal flange extremity inwardly past the rim shoulder 14 and with the portion thereof joining the bottom of the dished portion 19 disposed in generally diverging radially inwardly spaced telescoped relation to the axially outer portion of the intermediate flange 13.

Stiffening and reinforcing the outer marginal cover portion 20 and providing cover retaining means is an annular circularly continuous generally radially and axially inwardly extending underturned flange 21 which joins the cover portion 20 on a turned finishing and reinforcing extremity juncture rib 22. The flange 21 is nested within the back of the cover portion 20 in reinforcing, protective relation and is of a width to extend radially and axially inwardly past the rim shoulder 14.

At its inner extremity, the underturned flange 21 is provided with cover retaining terminal means for retaining engagement with the intermediate flange 13. In the present instance, the cover retaining means comprise a circumferential series of generally axially inwardly extending cover retaining fingers 23 having short and stiff generally radially and axially outwardly extending terminal flange legs 24 that are engageable in edgewise thrusting retaining gripping relation with the inner face of the terminal flange 13. Normally the tips of the terminal legs 24 extend to a slightly greater diameter than the diameter of the axially outer portion of the intermediate flange 13 so that in the fully assembled relationship of the cover with the wheel, the retaining fingers 23 are resiliently radially inwardly deflected and tensioned to afford strong retaining thrust for the retaining terminals.

Figure 3:
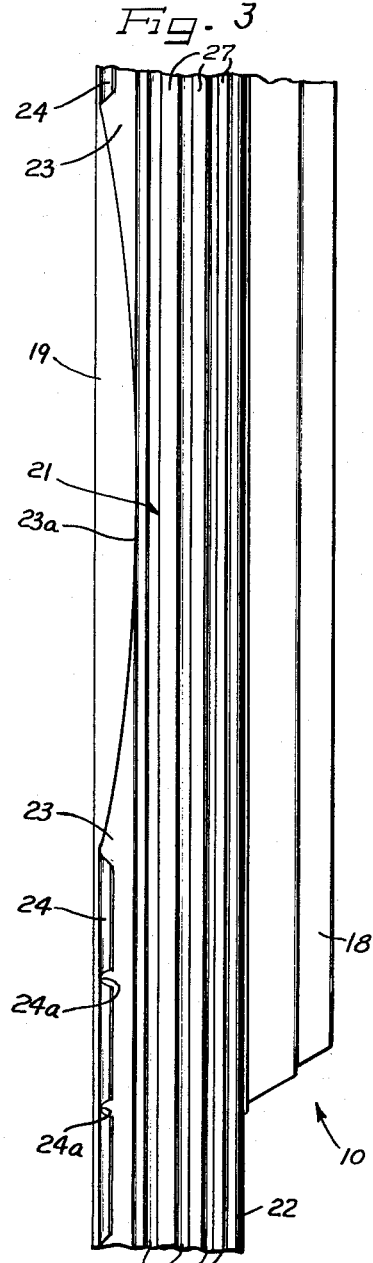
FIGURE 3 is a fragmentary edge elevational view of the cover.

It may be noted that in a preferred arrangement there may be four or more of the retaining fingers 23 equidistantly circumferentially spaced and with shallow arcuate cut-outs 23a (FIG. 3) separating the same and with the sides of the fingers flaring at said cut-outs into the adjacent edge of the flange 21. Retaining engagement of the finger terminals 24 is facilitated in the wide form of the finger shown by providing notches 24a at uniformly spaced intervals therein.

In order to stiffen the underturned flange 21 and make it a more effective reinforcement for the marginal cover portion 20 as well as to make it a more effective pry-off tool damage protecting means for the cover portion 20 as well as to facilitate coaction thereon with a pry-off tool, a plurality of concentric spaced circular corrugation-like reinforcing ribs and grooves are provided in the flange 21. These comprise generally axially outwardly projecting spaced ribs 25 alternating with generally axially inwardly projecting ribs 27. Between the ribs 27, the ribs 25 provide inwardly opening grooves. In the exemplary embodiment shown, there are four of the ribs 25 alternating with three of the ribs 27 and it will be observed that the ribs 25 bear against the inner face of the marginal cover portion 20 while the alternate ribs 27 are thereby maintained in spaced relation to the back of the cover portion 20. It will also be observed that the ribs 25 are narrow relative to the ribs 27 and in this instance have been pressed from the normal plane of the flange 21.

One of the outwardly projecting circular ribs 25 is located adjacent to the inner extremity of the flange 21 and serves as a back-up and leverage shortening fulcrum for the retaining finger extensions 23 and the adjacent terminal portion of the flange enhancing the resilient resistance to radial deflection thereof toward the opposing generally diverging portion of the dished cover portion 19. Such adjacent portion of the dished cover portion 19 is, however, sufficiently close to the radially inner sides of the retaining fingers 23 for bottoming thereagainst in cushioned relation in the event of unusual transverse forces on the cover such as may be occasioned by severe road shocks, thus avoiding undue diametrical displacement of the cover and thus possibly undue loosening of the retaining grip of the retaining finger terminals 24 of the retaining fingers generally diametrically opposite to the direction of lateral or diametrical shift responsive to the road shock or other force.

Outwardly adjacent to the innermost of the ribs 25, the inwardly projecting rib 27 is preferably cross-sectionally generally flat crowned and engageable as a centering and bottoming or axially inward stop shouldering engagement means for bottoming against the rim shoulder 14.

In applying the cover 10 to the outerside of the wheel, a valve stem aperture 28 is registered with a valve stem 29 and the cover pressed axially inwardly to engage the retaining fingers with the intermediate flange 13 and until the bottoming rib 27 engages uniformly and in cover centering relation against the rim flange shoulder 14. In this fully assembled relationship of the cover to the wheel, the radially outer portion of the cover margin 20 and the underturned flange 21 overlie the terminal flange 15 in sufficiently spaced relation to accommodate wheel balancing weights therebehind, and also to provide a pry-off tool gap between the extremity of the terminal flange and the extremity of the cover.

For removing the cover 10 from the wheel, a pry-off tool P such as a screwdriver or the like is inserted into the gap between the cover marginal extremity and the terminal flange 15 and pry-off leverage applied. In this, the inwardly opening grooves defined by the underturned flange ribs 25 provide desirable pry-off tool receiving recesses while the radially inner sides of the respective ribs 27 afford respective shoulders against which the pry-off tool tip is engageable in substantially non-slip relationship for exerting pry-off leverage against the cover margin. Since there is a plurality of the alternating grooves 25 and 27 progressively inwardly from the edge of the cover, it will be appreciated that excellent progressively effective leverage points are provided for the pry-off tool as the axially outward pry-off displacement of the cover progresses. It will also be appreciated that since the pry-off leverage is exerted by the tip of the tool against the inwardly projecting ribs 27, any indentation that may occur as a result of either too vigorous application of pry-off force or because of an overly sharp pry-off tool tip, or otherwise, will not be transmitted to the outer cover marginal portion 20 and there will thus be freedom from marring thereof from this source.

The cover 10 may be made from suitable sheet metal strip or plate such as stainless steel, brass or the like adapted to be drawn into shape and adapted to receive or to be provided with a desirable surface finish.

It will be understood that modifications and variations may be effected without departing from the scope of the novel concepts of the present invention.

I claim as my invention:

1. In a wheel structure including a tire rim having an intermediate flange joined to a terminal flange on a juncture shoulder, a cover for disposition at the outer side of the wheel having a generally radially and axially outwardly projecting circular marginal portion of substantially smooth transverse contour for overlying the terminal flange and having an inner portion for disposition in spaced divergent opposition to the axially outer portion of the intermediate flange, the cover having behind said marginal portion a circular flange nested therewith and provided with cover retaining extension means extending generally axially inwardly between said inner portion of the cover outer marginal portion and retainingly engageable with the intermediate flange, said nested flange having a series of concentric reinforcing and pry-off facilitating ribs therein certain of which engage the inner side of said cover marginal portion and others of which are spaced away from said cover marginal portion and are adapted to receive a pry-off tool thereagainst during pry-off and being in spaced relation from the marginal portion preventing transmission to the marginal portion of any indentations that may be made in such spaced ribs by the pry-off tool.

2. In a wheel structure including a tire rim having an intermediate flange joined to a terminal flange on a juncture shoulder, a cover for disposition at the outer side of the wheel having a generally radially and axially outwardly projecting circular marginal portion for overlying the terminal flange and having an inner portion for disposition in spaced divergent opposition to the axially outer portion of the intermediate flange, the cover having behind said marginal portion a circular flange nested therewith and provided with cover retaining extension means extending generally axially inwardly between said inner portion of the cover outer marginal portion and retainingly engageable with the intermediate flange, said nested flange having a series of concentric reinforcing and pry-off facilitating ribs therein certain of which engage the inner side of said cover marginal portion and others of which are spaced from said cover marginal portion, one of said spaced ribs bottoming as a centering means against said juncture shoulder of the rim and maintaining an adjacent radially and axially outwardly one of the spaced ribs spaced axially outwardly from the terminal flange to facilitate engagement thereof by a pry-off tool inserted behind the nested flange.

3. In a wheel structure including a tire rim having an intermediate flange joined to a terminal flange on a juncture shoulder, a cover for disposition at the outer side of the wheel having a generally radially and axially outwardly projecting circular marginal portion for overlying the terminal flange and having an inner portion for disposition in spaced divergent opposition to the axially outer portion of the intermediate flange, the cover having behind said marginal portion a circular flange nested therewith and provided with cover retaining extension means extending generally axially inwardly between said inner portion of the cover outer marginal portion and retainingly engageable with the intermediate flange, said nested flange having a series of concentric reinforcing and pry-off facilitating ribs therein certain of which engage the inner side of said cover marginal portion and others of which are spaced from said cover marginal portion, the axially innermost of said engaging ribs being disposed adjacent to said retaining means and serving as a resiliency enhancing back-up shoulder against the cover marginal portion and maintaining said retaining means in spaced relation to said inner portion of the circular marginal portion.

4. In a wheel structure including a tire rim having a generally radially inwardly facing flange, a cover for disposition at the outer side of the wheel including a circular outer marginal portion for overlying the tire rim and having therebehind a circular flange structure provided with generally axially inwardly extending retaining finger extensions engageable retainingly with the radially facing rim flange, said cover flange being backed against the cover adjacent to said fingers and the cover having a portion thereof disposed in limited radially inwardly spaced relation to the fingers and engageable with the fingers as cushioning stop means responsive to road shocks or the like to thereby avoid excessive radial displacement of the cover.

5. In a cover for disposition at the outer side of a vehicle wheel, a sheet metal cover plate having a generally radially and axially outwardly extending transversely substantially smooth marginal portion provided therebehind with a generally radially and axially inwardly extending nested flange having inner terminal retaining means for engagement with a wheel flange, said cover flange having a circular generally radially spaced series of circumferential corrugations therein providing a graduated plurality of pry-off shoulders spaced from the marginal portion and thereby avoiding transmission to the marginal portion of any pry-off tool dents that may be made in the shoulders.

6. In a cover for disposition at the outer side of a vehicle wheel, a sheet metal cover plate having a generally radially and axially outwardly extending marginal portion provided therebehind with a generally radially and axially inwardly extending nested flange having inner terminal retaining means for engagement with a wheel flange, said cover flange having a circular generally radially spaced series of circumferential corrugations therein providing a graduated plurality of pry-off shoulders, a plurality of said corrugations engaging against the back of the cover marginal portion and others of said corrugations, alternating with said engaging corrugations and projecting into spaced relation to said cover marginal portion and maintaining substantial intervening portions of the flange spaced from said marginal portion.

7. In a cover for disposition at the outer side of a vehicle wheel, a sheet metal cover member having a generally radially and axially outwardly turned outer marginal portion with integrally in one piece therewith an underturned flange nested against said marginal portion and provided with cover retaining terminal means thereon, said nested flange having a plurality of spacer ribs therein engaging the inner side of said turned marginal portion.

References Cited in the file of this patent

UNITED STATES PATENTS

| | | |
|---|---|---|
| 1,958,484 | Lyon | May 15, 1934 |
| 2,544,705 | Lyon | Mar. 13, 1951 |
| 2,624,635 | Lyon | Jan. 6, 1953 |
| 2,683,628 | Lyon | July 13, 1954 |
| 2,683,632 | Lyon | July 13, 1954 |
| 2,725,257 | Maurer et al. | Nov. 29, 1955 |
| 2,917,341 | Lyon | Dec. 15, 1959 |